United States Patent
Choi

(10) Patent No.: US 9,840,208 B2
(45) Date of Patent: Dec. 12, 2017

(54) DOOR OUTBELT UNIT FOR VEHICLE AND VEHICLE DOOR THEREROF

(71) Applicant: Hyundai Motor Company, Seoul (KR)

(72) Inventor: Hyung-Sik Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/084,681

(22) Filed: Mar. 30, 2016

(65) Prior Publication Data

US 2017/0096114 A1 Apr. 6, 2017

(30) Foreign Application Priority Data

Oct. 5, 2015 (KR) ........................ 10-2015-0140034

(51) Int. Cl.
| | |
|---|---|
| *B60J 1/16* | (2006.01) |
| *B60R 13/04* | (2006.01) |
| *B60J 5/04* | (2006.01) |
| *F16B 5/06* | (2006.01) |

(52) U.S. Cl.
CPC ........... *B60R 13/043* (2013.01); *B60J 5/0405* (2013.01); *B60J 5/0468* (2013.01); *F16B 5/0664* (2013.01)

(58) Field of Classification Search
CPC .... B60R 13/043; F16B 5/0664; B60J 5/0468; B60J 5/0405
USPC ..................... 49/372, 374, 377, 492.1, 493.1
See application file for complete search history.

(56) References Cited

U.S. PATENT DOCUMENTS

| | | | | |
|---|---|---|---|---|
| 4,696,128 A | * | 9/1987 | Fukuhara | B60J 10/265 24/297 |
| 4,949,507 A | * | 8/1990 | Vaughan | B60J 10/21 428/122 |
| 5,085,005 A | * | 2/1992 | Yasukawa | B60J 10/244 15/250.1 |
| 5,199,760 A | * | 4/1993 | Vering | B60J 10/75 296/146.16 |
| 5,267,415 A | * | 12/1993 | Vaughan | B60J 10/75 49/374 |
| 5,353,549 A | * | 10/1994 | Henderson | B60J 10/75 49/377 |
| 5,358,764 A | | 10/1994 | Roberts et al. | |
| 5,363,537 A | * | 11/1994 | Schneider | B60J 10/265 24/289 |
| 5,463,831 A | * | 11/1995 | Shinagawa | B60J 10/24 49/377 |

(Continued)

FOREIGN PATENT DOCUMENTS

| | | | |
|---|---|---|---|
| JP | 04092721 A | * | 3/1992 |
| JP | 2004-509795 A | | 4/2004 |

(Continued)

*Primary Examiner* — Jerry Redman
(74) *Attorney, Agent, or Firm* — Mintz Levin Cohn Ferris Glovsky and Popeo, P.C.; Peter F. Corless

(57) ABSTRACT

A door outbelt unit for a vehicle door includes an end piece clip forming a "U"-shaped clip pocket, an end piece forming a pocket boss inserted into a clip pocket, and a door outbelt forming an internal space inserted and enclosed with an end piece to expose the pocket boss to the outside, in which the door outbelt is assembled only by a process of pressing the end piece in an H direction (vertical direction) after an end piece clip is assembled in an L direction (horizontal direction), so as to prevent lifting of the door outbelt or damage of parts during assembly.

11 Claims, 6 Drawing Sheets

(56) References Cited

U.S. PATENT DOCUMENTS

| | | | | |
|---|---|---|---|---|
| 5,740,640 A | * | 4/1998 | Yasuda | B60J 10/265 296/146.16 |
| 6,282,840 B1 | | 9/2001 | Vance | |
| 6,345,480 B1 | * | 2/2002 | Kemper | E04F 19/061 403/118 |
| 6,966,601 B2 | * | 11/2005 | Matsumoto | B60R 13/0206 296/146.2 |
| 7,171,785 B1 | | 2/2007 | Kelly et al. | |
| 8,001,727 B2 | * | 8/2011 | Ho | B29C 45/14467 49/374 |
| 8,549,790 B2 | * | 10/2013 | Murree | B60J 10/75 49/377 |
| 8,572,897 B2 | * | 11/2013 | Dishman | B60J 10/21 49/377 |
| 8,789,313 B2 | * | 7/2014 | Roll | B60J 10/75 49/377 |
| 9,003,709 B2 | * | 4/2015 | Patterson | B60J 10/008 49/377 |
| 9,038,318 B2 | * | 5/2015 | Jendrossek | B60J 10/041 49/377 |
| 9,169,688 B2 | * | 10/2015 | Wende | E06B 7/22 |
| 2007/0227072 A1 | * | 10/2007 | Kawase | B60J 10/75 49/377 |
| 2014/0183901 A1 | * | 7/2014 | Jun | B60R 13/04 296/146.2 |

FOREIGN PATENT DOCUMENTS

| | | |
|---|---|---|
| KR | 10-2008-0006974 A | 1/2008 |
| KR | 10-0802705 B1 | 2/2008 |

* cited by examiner

DOOR OUTBELT UNIT FOR VEHICLE AND VEHICLE DOOR THEREROF

CROSS-REFERENCE TO RELATED APPLICATION

This application claims under 35 U.S.C. §119(a) the benefit of Korean Patent Application No. 10-2015-0140034, filed on Oct. 5, 2015, the entire contents of which are incorporated by reference herein.

BACKGROUND (a) Technical Field

Exemplary embodiments of the present invention relate to a door outbelt unit, and more particularly, to a door for a vehicle in which the door outbelt unit includes a door outbelt and an end piece clip, which are separated from each other and can be assembled by pressing the door in a vertical direction.

(b) Description of the Related Art

Generally, a door includes a door window elevated by a window regulator, such that a door belt of an elastic material may block an outlet of the door window from the outside.

The door belt divides the outlet of the door window into a door inner belt sealing a door internal space in an inside of the door, and a door outbelt sealing the door internal space in an outside of the door.

In particular, a door assembling scheme for preventing a reduction in appearance due to an exposure of the door outbelt to the outside of the door has been used. Examples of the door assembling scheme include a screw type door assembling scheme and a clip type door assembling scheme.

The screw type door assembling scheme is a scheme of positioning the door outbelt from the outside of the door toward the door, in which a screw is fastened from the inside of the door toward the outside thereof to form a fixation power of the door outbelt.

The screw type door assembling scheme is a scheme of configuring the door outbelt along with an L direction clip and pushing the door outbelt from the outside of the door toward a horizontal (or "L") direction to form the fixation power of the door outbelt by the fastening of the L direction clip with the door panel.

However, the screw type door assembling scheme exposes a screw head to the inside of the door after the screw fastening from the inside of the door toward the outside of the door. In this case, the exposure of the screw head reduces appearance marketability, and in particular, causes rust due to screw rusting.

Further, the screw type door assembling type may reduce marketability due to hardware exposure and screw rusting, and further has the possibility of clip damage due to the presence of the vertical pressing and the horizontal pressing, and in particular, may cause lifting of the door outbelt due to the clip damage or a step of the door outbelt between front and rear doors due to an assembling defect.

SUMMARY

An embodiment of the present invention is directed to a separation clip type door outbelt unit and a door assembly method and automobile door thereof, in which a door outbelt unit may be separated from an end piece clip by a door outbelt and the door outbelt pressed in a vertical (or "H") direction toward the end piece clip inserted into the door may be assembled with the door.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a separation clip type door outbelt unit includes: an end piece clip configured to form a "U"-shaped clip pocket; an end piece configured to form a pocket boss inserted into the clip pocket; and a door outbelt configured to form an internal space inserted and enclosed with the end piece to expose the pocket boss to the outside.

An inner circumferential surface of the clip pocket may be provided with a clip saw teeth and an outer circumferential surface of the pocket boss may be provided with an end piece saw teeth.

The end piece clip may be configured to include a connection body forming a clip pocket and an insert body integrally formed with the connection body and protruding toward one side of the connection body.

The insert body may be further provided with a locking protrusion and the locking protrusion may protrude from an outer circumferential surface of the insert body.

The insert body and the connection body may be connected to each other by a clip body and the clip body may be provided with an adhering surface to which the end piece adheres to be oriented toward the clip pocket.

The end piece may be configured of an end piece body integrally formed with the pocket boss and an end piece pocket may be formed between the end piece body and the pocket boss to allow the end piece body and the pocket boss to be spaced apart from each other.

One end portion of the end piece body may be integrally formed with an end body larger than a width size of the end piece body.

The door outbelt may be configured to include an outbelt body provided with an upper flange bent at an upper portion and a lower flange bent at a lower portion to form the internal space, a lower rib protruding from the outbelt body at the lower portion of the lower flange, and an upper rib protruding from the outbelt body at the upper portion of the upper flange.

The upper flange may be protrudedly provided with an auxiliary protrusion binding the end piece.

The lower rib and the upper rib may be elastically deformed.

In accordance with another embodiment of the present invention, a vehicle door includes: a door outbelt unit configured to include an end piece clip having an insert body which is integrally formed with a connection body forming a "U"-shaped clip pocket to protrude toward one side surface of the connection body, an end piece configured of an end piece body in which a pocket boss inserted into the clip pocket and integrated with the end piece clip is integrally formed, an end piece pocket formed between the end piece body and the pocket boss at a spaced interval, and a door outbelt having an outbelt body integrated with the end piece in an internal space inserted and enclosed with the end piece while forming a lower rib and an upper rib at a lower portion and an upper portion; and a clip hole configured to be formed in the outer panel so that the door outbelt unit is assembled with the outer panel, in which the door internal space in which a door window is elevated is formed between an inner panel and an outer panel.

The clip hole may be close to a portion where the outer panel is connected to a door frame forming an edge of an upper portion of the door.

The door outbelt unit may be assembled with a front door and a rear door, respectively.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present invention will be described in detail with reference to the accompanying drawings and these embodiments may be implemented in various forms by a person having ordinary skill in the art to which the present invention pertains and therefore the present invention is not limited to the embodiments described herein.

Figure 1:
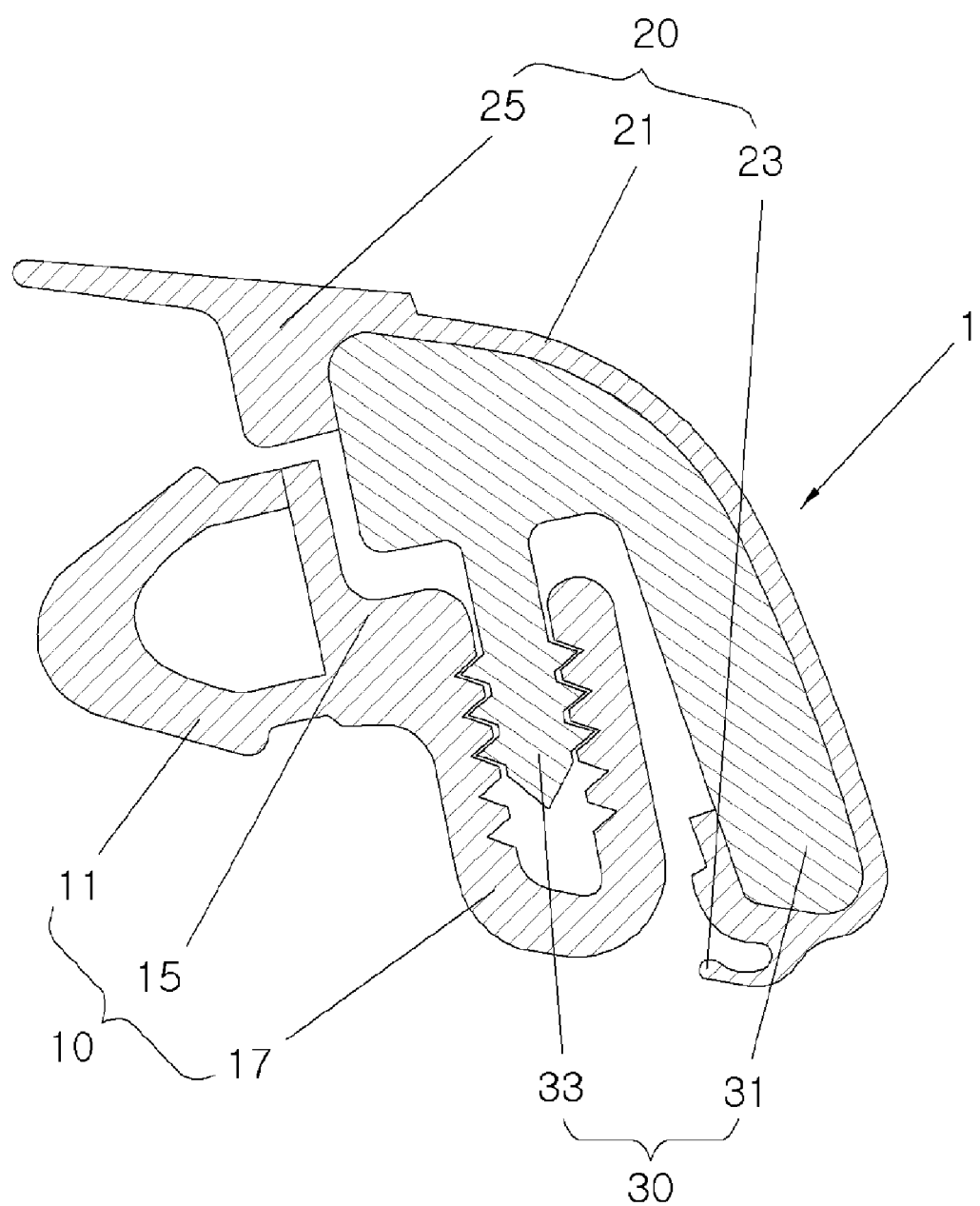
FIG. 1 is a cross-sectional view of a separation clip type door outbelt unit according to an exemplary embodiment of the present invention.
Figure 2:
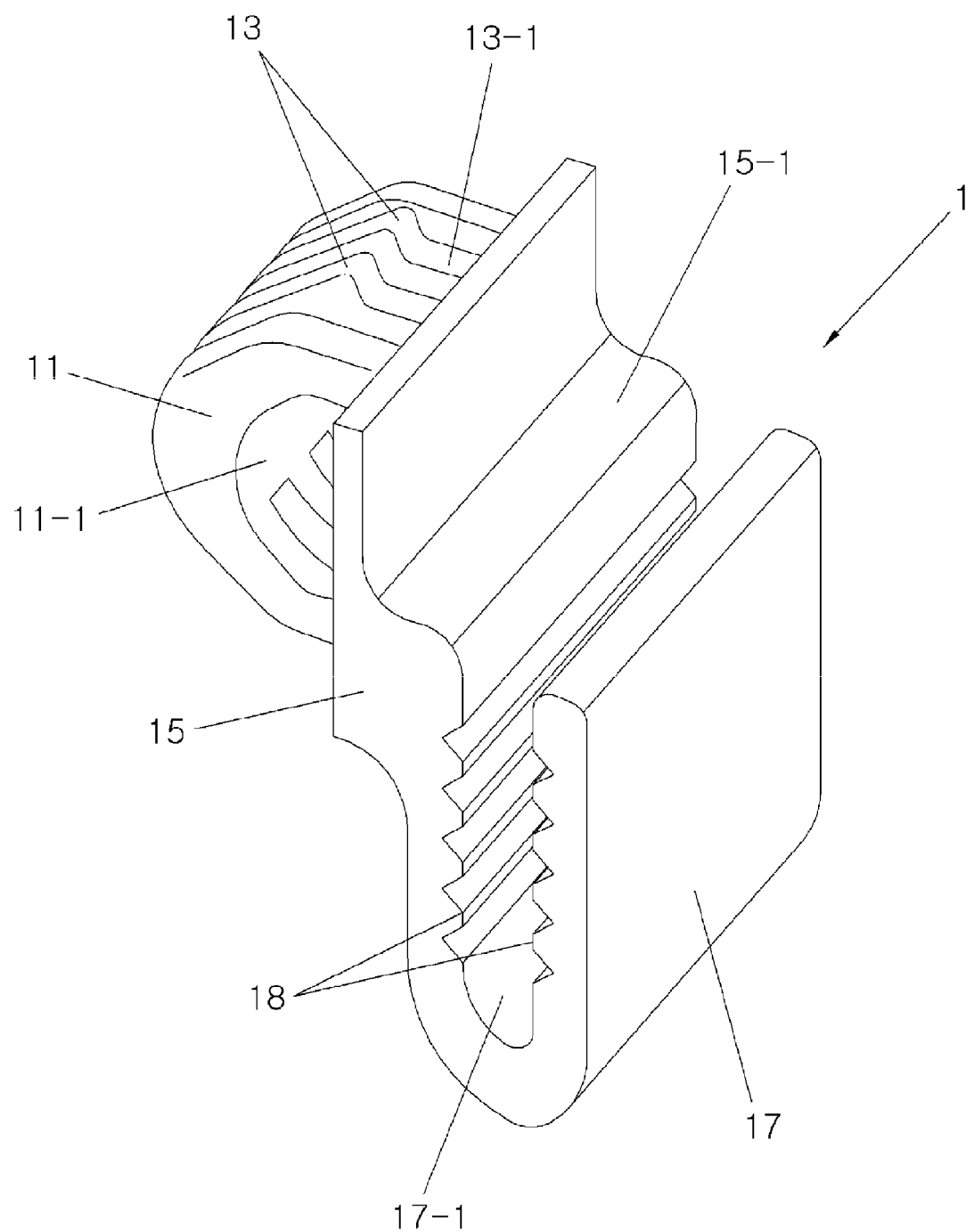
FIG. 2 is a perspective view of an end piece clip according to an exemplary embodiment of the present invention.
Figure 3:
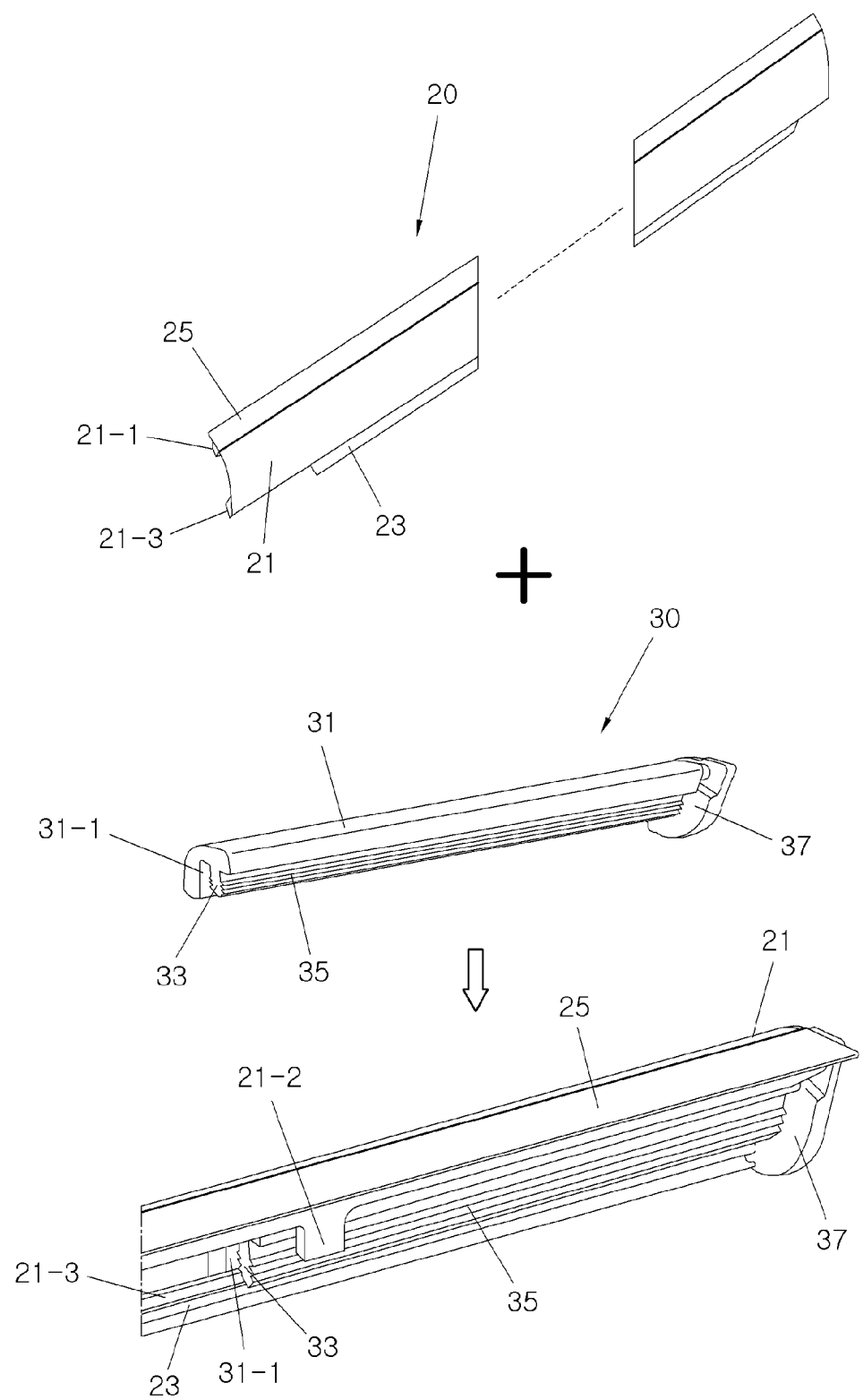
FIG. 3 is an assembly view of a door outbelt and an end piece according to an exemplary embodiment of the present invention.

FIGS. 1 to 3 illustrate a separation clip type door outbelt unit according to an exemplary embodiment of the present invention.

Referring to FIG. 1, a door outbelt unit 1 is configured of an end piece clip 10, a door outbelt 20, and an end piece 30. The door outbelt 20 is coupled with the end piece 30 in a state in which it is coupled with the end piece clip 10, such that the end piece clip 10, the door outbelt 20, and the end piece 30 are integrated. In particular, the end piece clip 10, the door outbelt 20, and the end piece 30 preferably are made of an elastic material.

Referring to FIG. 2, the end piece clip 10 is divided into an insert body 11, a clip body 15, and a connection body 17 which are integrally formed.

In detail, the insert body 11 is inserted into a hole of the other part with which the door outbelt unit 1 is coupled and then is bound by being locked around the hole, thereby forming fixation power of the end piece clip 10. To this end, the insert body 11 is a hollow deformation hole 11-1 penetrating through the body to facilitate elastic deformation of the body, and is bound by a locking protrusion 13 protruding to divide a stepped surface 13-1 of the body, thereby forming the fixation force. In particular, the locking protrusion 13 is formed in plural on an outer circumferential surface of the body at an interval from each other, and thus even if the end piece clip 10 is pulled, holds binding power to prevent the end piece clip 10 from being separated.

In detail, the clip body 15 is integrated with the insert body 11 on one side and is integrated with the connection body 17 on the other side to divide the insert body 11 and the connection body 17. In particular, the clip body 15 forms an adhering surface 15-1 at a position lower than the insert body 11, such that the end piece 30 inserted into the connection body 17 is formed in a state in which it adheres to the end piece clip 10.

In detail, the connection body 17 forms a "U"-shaped clip pocket 17-1 to have the end piece 30 inserted thereinto. In particular, the clip pocket 17-1 has a plurality of clip saw-teeth 18 formed on an inner circumferential surface thereof to strengthen the fixation power of the end piece clip 10 and the end piece 30.

Referring to FIG. 3, the door outbelt 20 is divided into an outbelt body 21, a lower rib 23, and an upper rib 25 which are integrally formed.

In detail, the outbelt body 21 is divided into an outer circumferential surface, which has a generally smooth appearance, and an inner circumferential surface for enclosing the end piece 30 and has a total length suited for a door width. In particular, an upper flange 21-1 bent at an upper portion of the inner circumferential surface of the outbelt body 21 and a lower flange 21-3 bent at a lower portion thereof form an internal space enclosing the end piece 30 and an auxiliary protrusion 21-2 protrudes at the upper flange 21-1 to form the fixation power of the end piece 30 coupled with the outbelt body 21.

In detail, the lower rib 23 is provided along the total length of the outbelt body 21 at the lower portion of the outbelt body 21 to be elastically deformed, such that it adheres to a lower portion of the other part with which the door outbelt unit 1 is coupled.

In detail, the upper rib 25 is provided along the total length of the outbelt body 21 at the upper portion of the outbelt body 21 to be elastically deformed, such that it adheres to an upper portion of the other part with which the door outbelt unit 1 is coupled.

Referring again to FIG. 3, the end piece 30 is divided into an end piece body 31, a pocket boss 33, and an end body 37 which are integrally formed.

In detail, the end piece body 31 is inserted into the internal space formed by the upper flange 21-1 and the lower flange 21-3 of the outbelt body 21 and has an upper portion bound by the auxiliary protrusion 21-2 of the upper flange 21-1 in the inserted state to form the fixation power with the outbelt body 21 and have the total length suited for the length of the outbelt body 21. In particular, the end piece body 31 forms an end piece pocket 31-1 as the spaced space to protrude in the state in which the pocket boss 33 is integrated with the end piece body 31 and the end piece pocket 31-1 is provided into a space into which the lower flange 21-3 of the outbelt body 21 is inserted.

In detail, the pocket boss 33 is divided into the end piece body 31 in the state in which it is integrally formed with the end piece body 31 using the end piece pocket 31-1. In particular, a plurality of end piece saw teeth 35 are formed on outer circumference surfaces of both sides of the pocket boss 33 to engage a clip saw teeth 18 of the end piece clip 10, thereby strengthening the fixation power of the end piece clip 10 and the end piece 30.

In detail, the end body 37 is integrally formed to be larger than the width size of the end piece body 31 at an one end portion of the end piece body 31 to stop one end of the door outbelt 20 into which the end piece 30 is inserted, thereby preventing appearance from reducing.

Figure 4:
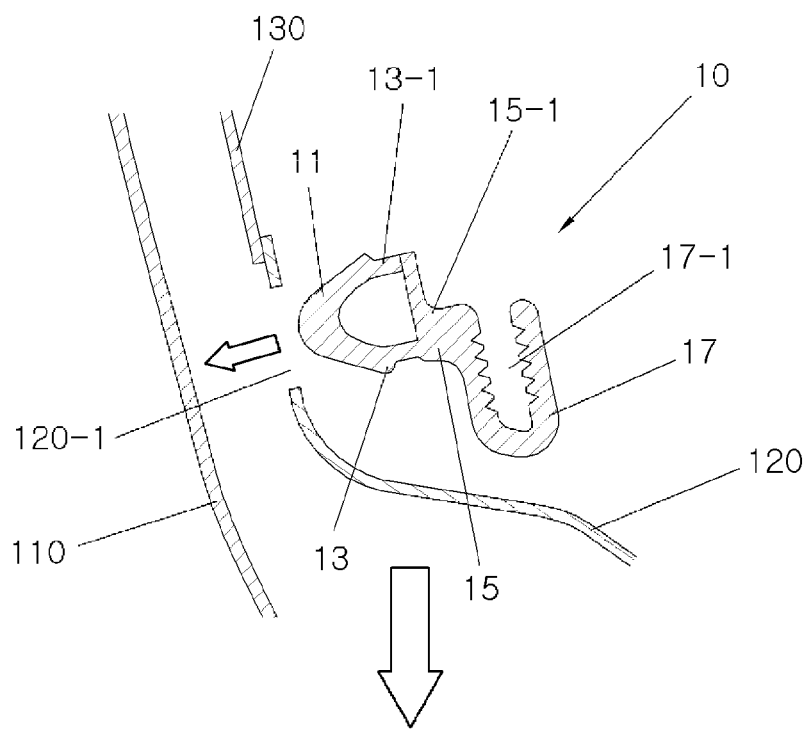
FIG. 4 is a view illustrating a state in which the end piece clip according to the exemplary embodiment of the present invention is assembled with the door.
Figure 4:
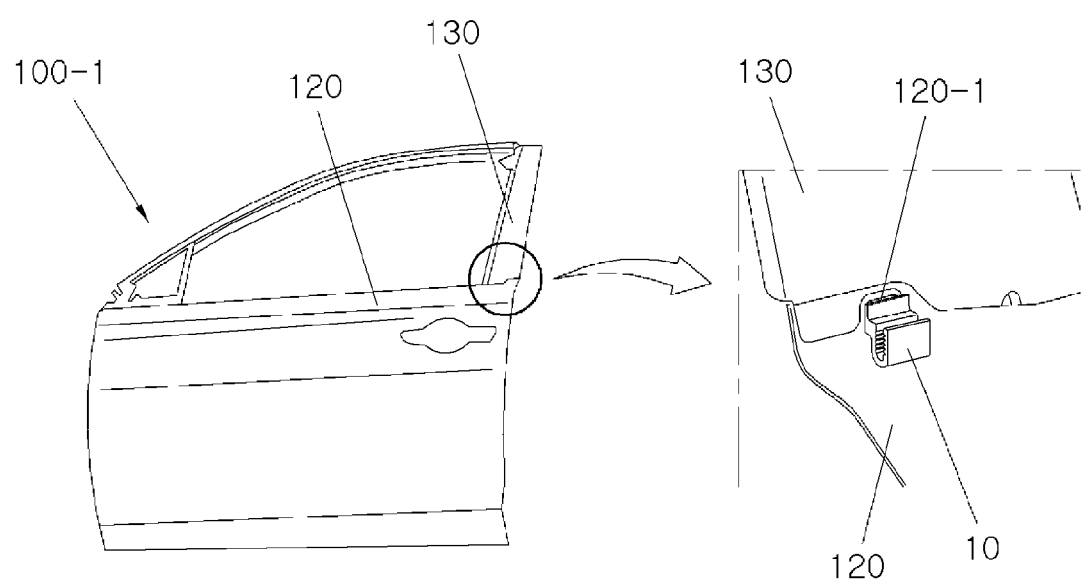
Figure 5:
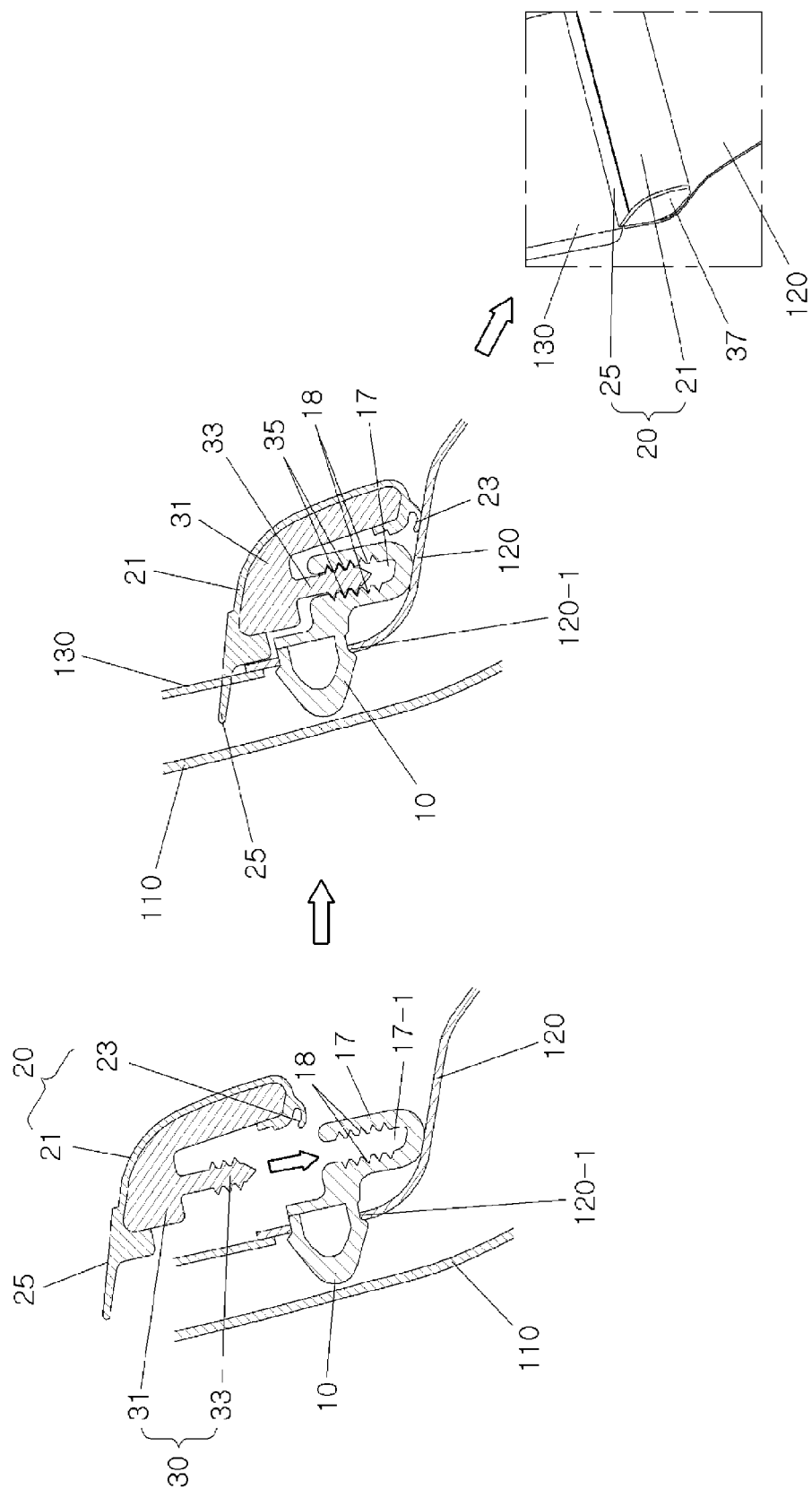
FIG. 5 is an assembly view illustrating a state in which the door outbelt according to the exemplary embodiment of the present invention is assembled with an end piece clip in a state in which it is coupled with the end piece.

FIGS. 4 and 5 illustrate the state in which the door belt unit 1 is assembled with a front door 100-1.

Referring to FIG. 4, in the front door 100-1, an inner panel 110 and an outer panel 120 form the internal space of the door and the outer panel 120 connected to the door frame 130 forming an edge of the upper portion of the door is perforated with a clip hole 120-1, thereby providing the space in which the end piece clip 10 is coupled with the front door 100-1. Therefore, a worker may insert the insert body 11 into the clip hole 120-1 in the state in which he/she holds the clip body 15 and the connection body 17 of the end piece clip 10, such that the insert body 11 is inserted into the door internal space of the inner panel 11 and the outer panel 120. In this case, pushing the end piece clip 10 toward the front door 100-1 means the assembly working of the L direction (horizontal direction). Next, the stepped surface 13-1 of the insert body 11 adheres to the clip hole 120-1 and the locking protrusion 13 adheres around the clip hole 120-1, thereby holding the bounding force to prevent the end piece clip 10 from being separated even if the end piece clip 1 is pulled.

As a result, the clip body 15 and the connection body 17 are exposed to the outside of the front door 100-1 in the state in which the end piece clip 10 is fixed to the front door 100-1.

Referring to FIG. 5, the worker may insert the end piece 30 into the internal space of the door outbelt 20 to assemble the door outbelt 20 with the end piece 30. In this case, the worker confirms the state in which the end piece body 31 of the end piece 30 is bounded by being fixed by the upper flange 21-1, the lower flange 21-3, and the lower flange 21-3 of the door outbelt 20.

Next, the pocket boss 33 of the end piece 30 is suited for the "U"-shaped clip pocket 17-1 formed at the connection body 17 of the end piece clip 10 and then the door outbelt 20 is pressed down toward the end piece clip 10 to complete the assembly of the end piece 30 with the end piece clip 10. Next, the end piece saw-teeth 35 of the end piece 30 is engaged with the clip saw teeth 18 of the end piece clip 10 and thus the end piece 30 is coupled with the end piece clip 10 by strong fixation power. In this case, pressing the end piece 30 toward the end piece clip 10 means the assembly working in the H direction (vertical direction).

As a result, the door outbelt 20 holds the coupled state with the end piece clip 10 via the end piece 30. In the assembled state, the outbelt body 21 of the door outbelt 20 is positioned at the outside portion of the door of the outer panel 120 of the front door 100-1 to provide beautiful appearance, the lower rib 23 adheres to the outer panel 120 of the front door 100-1, and the upper rib 25 adheres to the door window elevating the door internal space to block the door internal space from the outside.

Figure 6:
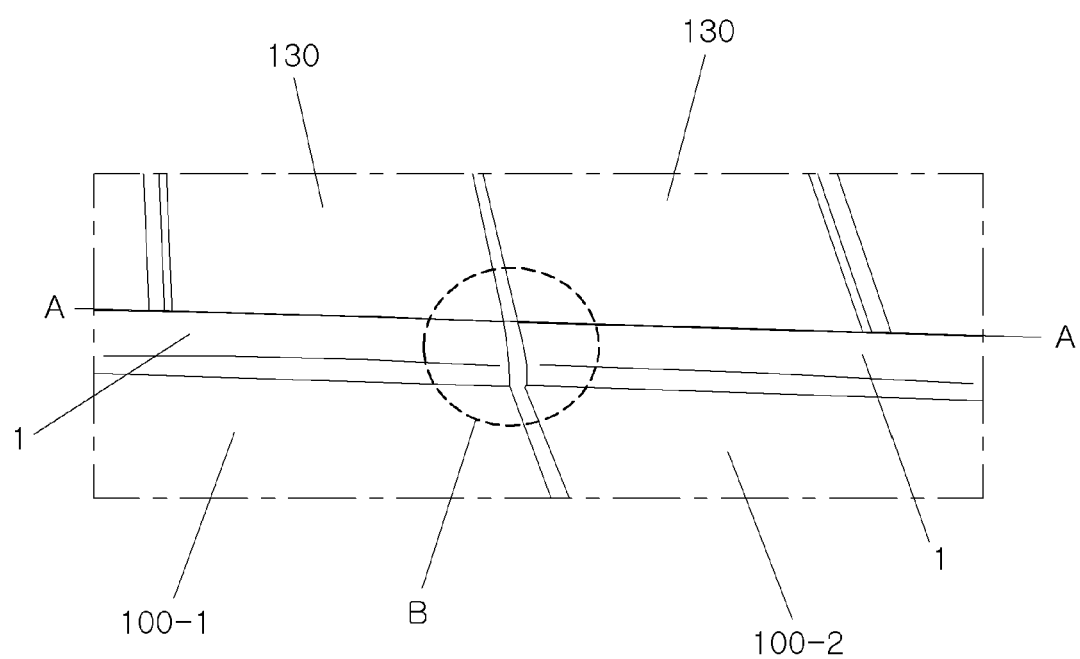
FIG. 6 is a partial view of front and rear doors of a vehicle in which the separation clip type door outbelt unit according to the exemplary embodiment of the present invention is assembled.

Meanwhile, referring to FIG. 6, the door outbelt unit 1 of the front door 100-1 and the door outbelt unit 1 of the rear door 100-2 forms the same line A-A in an adjacent area B in which they face each other without a step due to the lifting.

Therefore, the door outbelt unit 1 may be easily assembled with the front door 100-1 and the rear door 100-2 only by the assembly process in the L direction and the H direction and in particular, there is no damage risk of the end piece clip 10 during the assembly process, such that the step occurrence of the door outbelt between the front and rear doors 100-1 and 100-2 caused by the lifting or the assembly defect of the door outbelt 20 due to the clip damage may be prevented.

As described above, the vehicle door according to the present embodiment is provided with the door outbelt unit 1, in which the door outbelt unit 1 is configured to include the end piece clip 10 forming the "U"-shaped clip pocket 17-1, the end piece 30 forming the pocket boss 33 inserted into the clip pocket 17-1, and the door outbelt 20 forming the internal space inserted and enclosed with the end piece 30 to expose the pocket boss 33 to the outside, thereby completing the assembly of the door outbelt 20 only by the process of pressing the end piece 30 in an H direction (vertical direction) after the end piece clip 10 is assembled in an L direction (horizontal direction) and in particular, prevents the lifting of the door outbelt 20 or the damage of parts during the assembly process, thereby greatly improving the appearance marketability of the door and the rusting compared to the screw type and greatly improving the assembly performance, the lifting, and the A/S performance of the door compared to the clip type.

According to the door outbelt unit according to the exemplary embodiments of the present invention, the end piece clip is separated from the door outbelt as a separate thing, thereby performing the door outbelt assembly at the outside of the door like the existing clip type, and in particular, the door outbelt and the end piece clip are assembled with the door without the presence in the H direction and the L direction, thereby improving the assembly performance and the damage risk.

Further, according to the door outbelt unit according to the exemplary embodiments of the present invention, the door outbelt pressed toward the end piece clip inserted into the door in the H direction is assembled with the door, thereby greatly improving the appearance marketability and the rusting of the door compared to the screw type and greatly improving the assembly performance, the lifting, and the A/S performance of the door compared to the clip type.

The foregoing exemplary embodiments are only examples to allow a person having ordinary skill in the art to which the present invention pertains (hereinafter, referred to as "those skilled in the art") to easily practice the present invention. Accordingly, the present invention is not limited to the foregoing exemplary embodiments and the accompanying drawings, and therefore, a scope of the present invention is not limited to the foregoing exemplary embodiments. Accordingly, it will be apparent to those skilled in the art that substitutions, modifications and variations can be made without departing from the spirit and scope of the invention as defined by the appended claims and can also belong to the scope of the present invention.

What is claimed is:

1. A separation clip with door outbelt unit for a vehicle door, comprising:
    an end piece clip configured to form a "U"-shaped clip pocket;
    an end piece configured to form a pocket boss inserted into the clip pocket; and
    a door outbelt configured to form an inner space for enclosing the end piece to expose the pocket boss to an outside,
    wherein the end piece clip includes a connection body forming the clip pocket and an insert body integrally formed with the connection body and protruding toward one side of the connection body,
    the insert body and the connection body are connected to each other by a clip body, and
    the pocket boss includes a plurality of end piece saw teeth configured to engage with a plurality of clip saw teeth formed in the clip pocket when the pocket boss is pressed down toward the clip pocket.

2. The separation clip with door outbelt unit of claim 1, wherein an inner circumferential surface of the clip pocket is provided with the clip saw teeth, and an outer circumferential surface of the pocket boss is provided with the end piece saw teeth.

3. The separation clip with door outbelt unit of claim 1, wherein the insert body is further provided with a locking protrusion, and the locking protrusion protrudes from an outer circumferential surface of the insert body.

4. The separation clip with door outbelt unit of claim 1, wherein the end piece is arranged as an end piece body integrally formed with the pocket boss, and an end piece pocket is formed between the end piece body and the pocket boss to allow the end piece body and the pocket boss to be spaced apart from each other.

5. The separation clip with door outbelt unit of claim 4, wherein one end portion of the end piece body is integrally formed with an end body.

6. The separation clip with door outbelt unit of claim 1, wherein the door outbelt includes an outbelt body provided with an upper flange bent at an upper portion and a lower flange bent at a lower portion to form the inner space, a lower rib protruding from the outbelt body at the lower portion of the lower flange, and an upper rib protruding from the outbelt body at the upper portion of the upper flange.

7. The separation clip with door outbelt unit of claim 6, wherein the upper flange is protrudedly provided with an auxiliary protrusion binding the end piece.

8. The separation clip with door outbelt unit of claim 6, wherein the lower rib and the upper rib are elastically deformed.

9. A vehicle door, comprising:
    a door outbelt unit configured to include an end piece clip having an insert body which is integrally formed with a connection body forming a "U"-shaped clip pocket to protrude toward one side surface of the connection body, an end piece arranged as an end piece body in which a pocket boss inserted into the clip pocket and integrated with the end piece clip is integrally formed, an end piece pocket formed between the end piece body and the pocket boss at a spaced interval, and a door outbelt having an outbelt body integrated with the end piece that is enclosed in an inner space of the outbelt body while forming a lower rib and an upper rib at a lower portion and an upper portion; and
    a clip hole formed in an outer panel,
    wherein a door inner space in which a door window is elevated is formed between an inner panel and the outer panel, and
    the pocket boss includes a plurality of end piece saw teeth configured to engage with a plurality of clip saw teeth formed in the clip pocket when the pocket boss is pressed down toward the clip pocket.

10. The vehicle door of claim 9, wherein the clip hole is provided where the outer panel is connected to a door frame forming an edge of an upper portion of the door.

11. The vehicle door of claim 9, wherein the door includes a front door and a rear door, and the door outbelt unit is assembled with the front door and the rear door, respectively.

* * * * *